US008078650B2

(12) United States Patent
McHugh et al.

(10) Patent No.: US 8,078,650 B2
(45) Date of Patent: Dec. 13, 2011

(54) PARSING UNSTRUCTURED RESOURCES

(75) Inventors: Barry McHugh, Redmond, WA (US);
Terry Farrell, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 424 days.

(21) Appl. No.: 12/297,990

(22) PCT Filed: Apr. 5, 2007

(86) PCT No.: PCT/US2007/008677
§ 371 (c)(1),
(2), (4) Date: Oct. 21, 2008

(87) PCT Pub. No.: WO2007/127037
PCT Pub. Date: Nov. 8, 2007

(65) Prior Publication Data
US 2009/0089263 A1  Apr. 2, 2009

(30) Foreign Application Priority Data

Apr. 21, 2006  (EP) .................................... 06270040

(51) Int. Cl.
*G06F 7/00* (2006.01)
*G06F 17/30* (2006.01)
(52) U.S. Cl. ........................................ 707/811; 717/136
(58) Field of Classification Search .................. 707/811; 717/136
See application file for complete search history.

(56) References Cited

U.S. PATENT DOCUMENTS

| 5,678,039 | A  |   | 10/1997 | Hinks et al. |
| 6,964,014 | B1 |   | 11/2005 | Parish |
| 6,983,238 | B2 | * | 1/2006  | Gao ................................ 704/8 |
| 7,523,125 | B2 | * | 4/2009  | Zeng ................................. 1/1 |
| 2001/0044809 | A1 |   | 11/2001 | Parasnis et al. |
| 2002/0107684 | A1 |   | 8/2002  | Gao |
| 2002/0111951 | A1 | * | 8/2002  | Zeng .......................... 707/100 |
| 2002/0143523 | A1 |   | 10/2002 | Balaji et al. |
| 2003/0101169 | A1 | * | 5/2003  | Bhatt et al. ...................... 707/3 |
| 2003/0131320 | A1 |   | 7/2003  | Kumhyr et al. |
| 2003/0135501 | A1 |   | 7/2003  | Frerebeau et al. |
| 2004/0172237 | A1 | * | 9/2004  | Saldanha et al. ................ 704/4 |
| 2005/0050526 | A1 |   | 3/2005  | Dahne-Steuber et al. |

(Continued)

FOREIGN PATENT DOCUMENTS

EP  1100004 A2  5/2001

(Continued)

OTHER PUBLICATIONS

EP Search Report dated Sep. 20, 2006 from EP 06270040, 12 pages.

(Continued)

*Primary Examiner* — John E Breene
*Assistant Examiner* — Joshua Bullock
(74) *Attorney, Agent, or Firm* — Lee & Hayes, PLLC

(57) ABSTRACT

Systems and methods of processing an unstructured resource which contains one or more data portions are described. The method comprises reading the unstructured resource into memory and accessing a data structure associated with the unstructured resource. This data structure contains a number of elements, each element including position information for a data portion in the unstructured resource. Using this position information, data portions are located from the unstructured resource and processed and the locating and processing steps are repeated for each element in the data structure.

20 Claims, 13 Drawing Sheets

U.S. PATENT DOCUMENTS

2005/0154979 A1* 7/2005 Chidlovskii et al. .......... 715/513
2006/0007466 A1* 1/2006 Ben-Yehuda et al. ....... 358/1.13

FOREIGN PATENT DOCUMENTS

| EP | 1315086 | A1 | 5/2003 |
| EP | 1530127 | A2 | 5/2005 |

OTHER PUBLICATIONS

Written Opinion of ISA dated Oct. 22, 2007 from PCT/US2007/008677.

Written Opinion of ISA dated Oct. 21, 2008 from PCT/US2007/008677.

* cited by examiner

PARSING UNSTRUCTURED RESOURCES

RELATED APPLICATIONS

This application is a National Stage of International Application No. PCT/US2007/008677, filed 5 Apr. 2007, which claims priority from European Patent Application No. 06270040.6, filed on 21 Apr. 2006. Both applications are incorporated herein by reference.

BACKGROUND

Software products, such as applications and operating systems, are often provided in many different language versions. The process of converting a software product from the initial language it was written in to other languages is known as 'localisation'. Typically the localisation is done by translating all the string elements within the user interface (UI) of the product and any other language specific parts (e.g. hotkeys, coordinates, sizes) and then re-building the product to produce the language specific version. This localised product then requires extensive testing before it can be shipped to a customer. This is very expensive and results in slow delivery of localised versions of software.

A different localisation method has been developed in which localisation occurs at run-time. In this method, the base product (e.g. the original English version) is loaded and the translated resources are inserted by a resource interceptor which obtains them from a language specific glossary file. This is done in a way that the application is unaware of. Although this method may not translate the entire application, it provides a less-labour intensive and less expensive way of localising software products because it removes the need to build and test. It also enables third parties to create new language glossaries for use with a software product which can result in the product being localised into many additional languages.

In order for the resource interceptor to be able to translate the resources within an application, the resource interceptor must be able to identify the translatable strings within the resources. This is trivial for structured resources, such as a WIN32 dialog box or a WIN32 string table, because they have a structure which is defined, (e.g. in a standard), and so it is easy to find the various resources and modify/replace them. However, not all resources are structured. Unstructured (or stream) resources are textual resources which have no pre-defined structure and which are stored inside files or streams. Typically such resources are able to be viewed/edited using a text editor program, such as Microsoft (trade mark) Notepad. Examples of unstructured resources include HTML files (which comprise strings, tags and other formatting characters), Java Script, INI files, Registry files, Cascading Style Sheets (CSS) and XML files. There are a very large number of schemas which are used to write these unstructured resources and knowledge of the correct schema is required to identify translatable strings within the unstructured resource. Even within a particular resource type, there may be many different ways that strings and other localisation data (such as hotkeys, sizes and coordinates) may be identified, for example:

| | |
|---|---|
| 1st HTML sample: | <P ID=Hello>Hello</P> |
| 2nd HTML sample: | <P><!—ID=ID_Hello-->Hello<!—end--></P> |
| 1st Java Script sample: | document.write("Hello") |
| 2nd Java Script sample: | L_Hello_Message = ("Hello") |
| | document.write(L_Hello_Message) |

In order for the resource loader to be able to identify the translatable string ("Hello") in each of these examples, it must know exactly how the translatable strings have been identified in each case. As there is no defined structure, it is not feasible for the resource loader to know every possible schema, format, external configuration data and rule because there are an infinite number of these. Even if the resource loader did know the particular schema, format and rules used in a particular situation, parsing will still be slow and in many applications this would be unacceptable (e.g. if performed during resource loads in a running application). Furthermore, the identifier information ("ID=Hello" and "<!-ID=ID_Hello-->... <!-end-->" in the two HTML examples above) may be removed when the file (e.g. the HTML file) is built in order to optimise the file size and enable the applications loading the files to do so more efficiently. Alternatively (or in addition) the identifier information may be removed for confidentiality reasons (e.g. the commenting of a file may be confidential) or to create a valid file structure (e.g. the HTML may be invalid until the flags are removed). In these cases the unstructured resource may contain no information which identifies the translatable resources, for example:

3rd HTML sample: <P>Hello</P>

This means that it is impossible for the resource loader to identify the strings within the unstructured resource.

In addition to identifying the location of strings within an unstructured resource, it may also be necessary to determine the unique identifier for each string for use in cross-referencing against other data (e.g. against translations in a glossary).

The invention seeks to provide methods of parsing unstructured resources that mitigates problems of known parsing methods and also to provide improved parsing tools.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Systems and methods of processing an unstructured resource which contains one or more data portions are described. The method comprises reading the unstructured resource into memory and accessing a data structure associated with the unstructured resource. This data structure contains a number of elements, each element including position information for a data portion in the unstructured resource. Using this position information, data portions are located and processed from the unstructured resource and the locating and processing steps are repeated for each element in the data structure.

The present example provides a method of processing an unstructured resource comprising: reading an unstructured resource into memory, the unstructured resource comprising one or more data portions; accessing a data structure associated with the unstructured resource, the data structure comprising one or more elements, each element being associated with a data portion and comprising position information for the associated data portion; reading a first element from the data structure into memory, the first element comprising position information for a first data portion; locating the first data portion within the unstructured resource using the position information for the first data portion; processing the first data portion; and repeating the reading, locating and processing steps for each of the one or more elements in the data structure.

Advantageously, this provides a method of processing which is faster, more efficient and requires less memory usage. Advantageously, the method can process data portions, such as strings, independent of the way that they were written, subsequently processed, compiled or translated. In some situations, this method enables processing of an unstructured resource which would not have been possible without the use of the data structure.

Preferably, the method further comprises: accessing a store of replacement data portions; and wherein processing the first data portion comprises: selecting a first replacement data portion from the store of replacement data portions based on the first element; and inserting the first replacement data portion into the unstructured resource in place of the first data portion.

Advantageously, this method can be used for localisation of a resource by replacing data portions which are suitable for use in one language with data portions that are suitable for use in a second language.

Preferably, reading an unstructured resource into memory comprises: reading an unstructured resource into memory from a location; and the method may further comprise: outputting an amended unstructured resource to the location.

Preferably, the method further comprises: following the selecting step, checking if a replacement string satisfies predefined criteria and if not, omitting the inserting step. If it is determined that the replacement data portion (e.g. string) may cause problems it can therefore not be inserted and the original data portion can be left in the resource.

Advantageously, this allows the replacement data portion (e.g. a replacement string) to be checked such that it does not cause problems when inserted and displayed in a user interface.

Preferably the predefined criteria comprise data portion length criteria, valid character criteria or a predefined resource list.

Advantageously, this enables the replacement data portion, such as a string to be checked to determine whether the string will be truncated when displayed, or if the replacement string is the right length, or if the replacement string has any invalid characters, or if the replacement string has any characteristics that could impair application functionality or introduce security problems. Use of a predefined resource list advantageously allows control of which data portions may be changed and which may not.

Preferably, the method further comprises: reading the predefined criteria into memory from the unstructured resource, the data structure or the store of replacement data portions.

Preferably, the method further comprises: prior to reading an unstructured resource into memory: loading an application; and checking a required language for the application; wherein the unstructured resource is associated with the application and the method further comprises: passing an amended unstructured resource to the application.

Advantageously, this enables processing of a resource, such as translation or conversion of a resource at the point when an application is loaded.

Preferably, the method further comprises: prior to accessing a store of replacement data portions, identifying the store of replacement data portions based on the required language for the application.

Preferably the store of replacement data portions comprises one of: a database of data portions translated for one or more languages and a dictionary database.

A data portion may comprise a string, a hotkey, a coordinate set, a size or any portion of data that is localisable, or modifiable.

In another example, the method further comprises: accessing a rules database; and wherein processing the first data portion comprises: amending the first data portion in accordance with the rules database to create a first amended data portion; and inserting the first amended data portion into the unstructured resource in place of the first data portion.

Preferably the data portion comprises a string and the rules database may comprise one or more of: length rules, allowed character rules, allowed word rules, prohibited word rules, grammar rules and spelling rules.

In another example, each data portion in the unstructured resource comprises a string in a first language, and processing the first data portion comprises extracting a first data portion, and the method further comprises: reading a second unstructured resource into memory, the second unstructured resource comprising one or more data portions, each data portion in the second unstructured resource comprising strings in a second language; accessing a second data structure associated with the second unstructured resource, the second data structure comprising one or more elements, each element being associated with a data portion in the second unstructured resource and comprising position information for the associated data portion; reading a first element from the second data structure into memory, the first element comprising position information for a first data portion in the second unstructured resource; extracting the first data portion from the second unstructured resource using the position information for the first data portion in the second unstructured resource; repeating the reading and extracting steps for each of the one or more elements in the second data structure; and outputting all the extracted data portions from both unstructured resources.

Advantageously this enables the automatic generation of a glossary in multiple languages.

Preferably the unstructured resource comprises one of: Java Script, Cascading Style Sheets, an INI file, a Registry file, an HTML file and an XML file. Alternatively the unstructured resource may comprise any textual format that can contain localisable or modifiable strings or data.

Preferably each element further comprises a data portion identifier.

Preferably the position information comprises at least one of: a data portion start position, a data portion length indicator and a data portion end position.

Preferably the data structure further comprises encoding information (e.g., Unicode, ANSI, etc).

The step of processing the first data portion may comprise: inserting a data element, such as a string.

Another example provides a method of processing an unstructured resource comprising: reading an unstructured resource into memory, the unstructured resource comprising locations for one or more data portion; accessing a data structure associated with the unstructured resource, the data structure comprising one or more elements, each element being associated with a data portion and comprising position information for the associated data portion; reading a first element from the data structure into memory, the first element comprising position information for a first data portion; inserting the first data portion using the position information for the first data portion; and repeating the reading and inserting steps for each of the one or more elements in the data structure.

Advantageously, this provides a simple method for localising a resource which is written in a non-language specific manner, whereby the resources do not even contain English strings or data. The resource is small in size so requires reduced memory space and can be loaded quickly and efficiently. Furthermore, this enables the translations (e.g. the store of strings) to be provided by a third party.

Another example provides a computer program comprising computer program code means adapted to perform all the steps of any of the methods when said program is run on a computer.

Preferably the computer program is embodied on a computer readable medium.

A further example provides a system comprising: a processor; and a memory, coupled with and readable by the processor and containing a series of instructions that, when executed by the processor, cause the processor to: read an unstructured resource into the memory, the unstructured resource comprising one or more data portions; access a data structure associated with the unstructured resource, the data structure comprising one or more elements, each element being associated with a data portion and comprising position information for the associated data portion; read a first element from the data structure into the memory, the first element comprising position information for a first data portion; locate the first data portion within the unstructured resource using the position information for the first data portion; process the first data portion; and repeat the reading, locating and processing steps for each of the one or more elements in the data structure.

The methods described may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
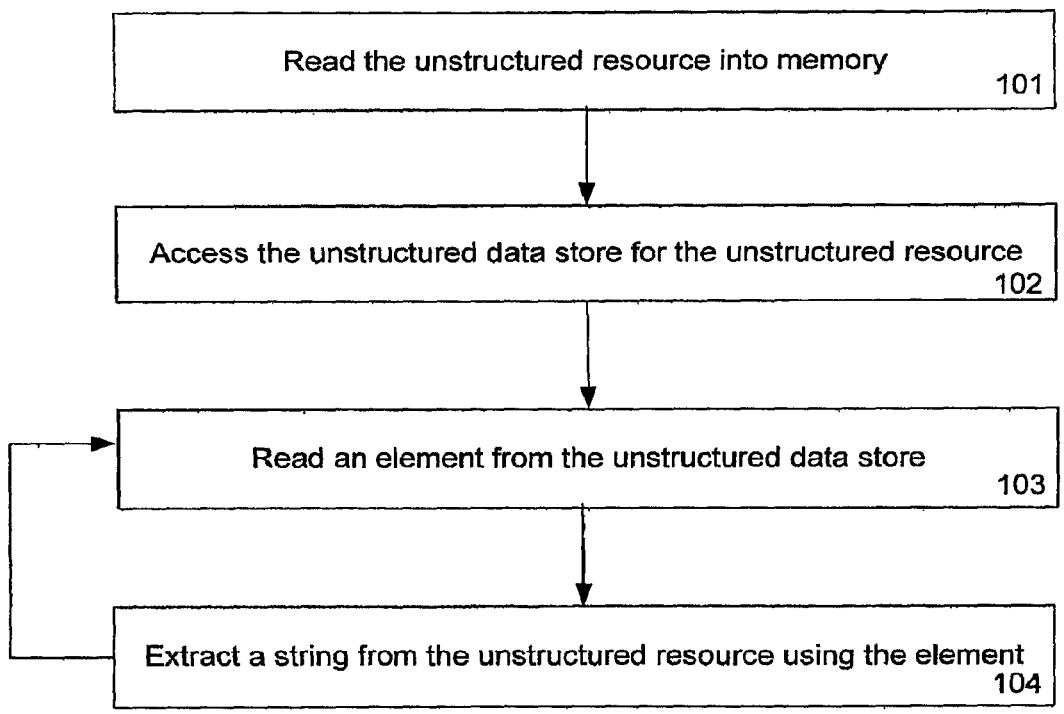
FIG. 1 is an example flow diagram of a method of parsing an unstructured resource.

FIG. 1 is an example flow diagram of a method of parsing an unstructured resource. The term 'parsing' is used herein to refer to resolving a stream (e.g. a sentence or piece of data) into its component parts. Examples of parsing include resolving a book into chapters, paragraphs, sentences or words, resolving a phone book into names, addresses and numbers, and resolving a cheque into fields etc. This method can be described with reference to FIG. 2, which shows a data structure referred to as an unstructured data store 200, and a simple example of an unstructured resource comprising an XML file containing:

<P>Hello</P>

The unstructured resource is read into memory (step 101) and an unstructured data store 200 associated with the unstructured resource is accessed (step 102). The unstructured data store 200 provides data which can be used to perform parsing of the unstructured resource irrespective of how the resource was originally written, parsed or localised. In the example shown, the unstructured data store 200 comprises encoding information 201 which details the Code Page of characters used in the resource content (e.g. Windows 1252, Unicode or UTF-7). The data store also comprises one or more elements 202 where each element provides information which relates to a string contained within the unstructured resource. In the example shown, the element comprises a string identifier 202a (e.g. 'ID_Hello'), also referred to as a resource identifier, which may be used for cross-referencing with rules, translation glossaries etc. The element also comprises string position information, for example the start position of the string 202b and the length of the string 202c. In the example shown, the start position is the offset of the start position of the first character in the string from the start of the resource file and the length is the number of characters contained within the string. An element 202 is read from the unstructured data store 200 into memory (step 103) and then the position information from this element is used to locate and extract a string from the unstructured resource (step 104). The example data store 200 shown in FIG. 2 only contains one element 202. However, where the data store comprises more than one element, the steps of reading an element and extracting a string may be repeated (steps 103 and 104) to extract additional strings from the unstructured resource.

Having extracted the strings (in step 104), the strings may be stored and/or further processing may occur and examples of additional processing steps are described in more detail below.

Figure 2:
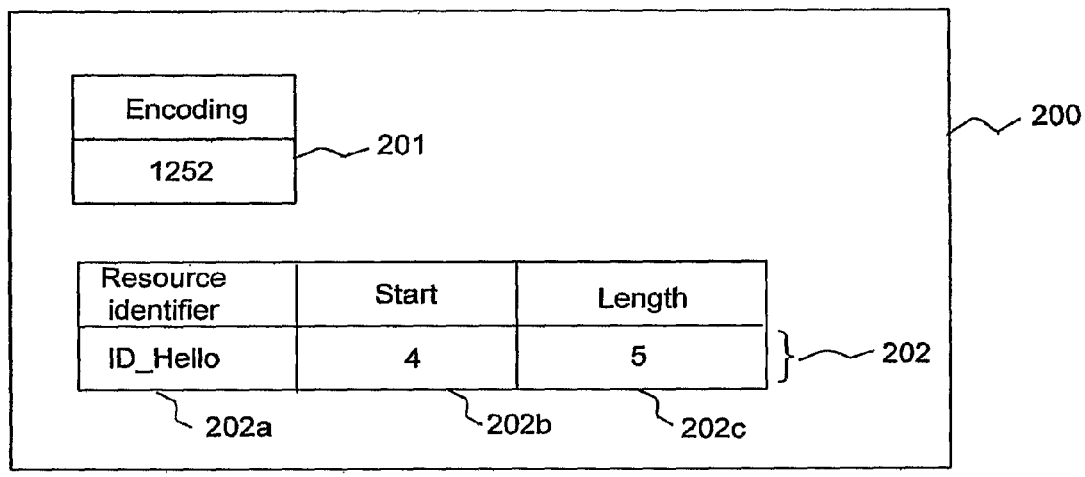
FIG. 2 is a schematic diagram of an unstructured data store.

The data store 200 shown in FIG. 2 is provided by way of example only and in other examples, the store may contain different information. In one example, string identifiers may not be included within the data store and in another example the string position information may be provided in a different format (e.g. start position and end position, just start position etc.). In a further example, the encoding information 201 may not be included within the data store. The data store 200 is language specific in that it depends on the original string stream. However, it is also possible to leave out any language data and within the unstructured resource and as such the data store would be language neutral, as described in more detail below.

By using a data store, such as data store 200, in which information is stored in a known format, it makes it very easy to parse any unstructured resource without requiring any knowledge of the schema, rules etc used in constructing the resource. This results in a simple unstructured resource parser and efficient parsing of the unstructured resource. Furthermore the data store does not require much memory, for example, for a four element store with title, only 113 Bytes are required (=3+(5*22)).

The data store may be stored anywhere which is accessible on parsing of the unstructured resource, for example the data store may be stored within the unstructured resource, alongside the original resource (e.g. in a dynamic link library (DLL)), on a server, on the internet, in a database, as an XML file or the data store may be provided by a web service.

Figure 3:
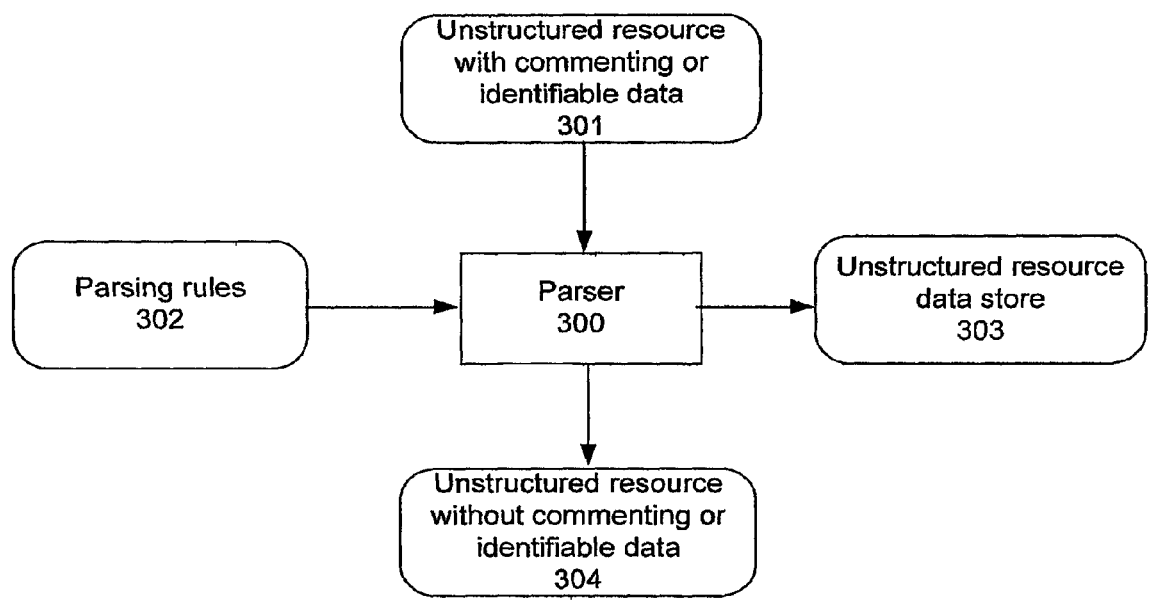
FIG. 3 is a schematic diagram showing the creation of a data store.

The unstructured data store 200 may be created in one of a number of ways. It is preferably created by someone/something that knows and understands the structure, schema and rules used to create the particular resource and it may be created at any time whilst this information and any required flags are still available. For example, it may be created prior to shipping the resource by the person/organisation that wrote the resource. It could be created by hand, however this would be time consuming and may be prone to errors. In another example, the data store 200 may be created by an automated tool that uses parsing code and parsing rules to obtain and write the data. A schematic diagram showing the creation of a data store is shown in FIG. 3.

An unstructured resource with commenting or identifiable data 301 is input to a parser 300, which parses the resource using parsing rules 302. These rules 302 may be input to the parser or alternatively, the parser may be specific to a particular resource type and therefore have the rules inherently within it. The parser 300 uses the rule information to identify some/all of the strings in the resource and outputs an unstructured resource data store 303 (as shown in FIG. 2) containing an element for each identified string. The parser may additionally output an edited version of the unstructured resource without the commenting 304.

In an example, the unstructured resource 301 may be an XML file including:

<para its:translate="yes">Hello</para>

Figure 4:
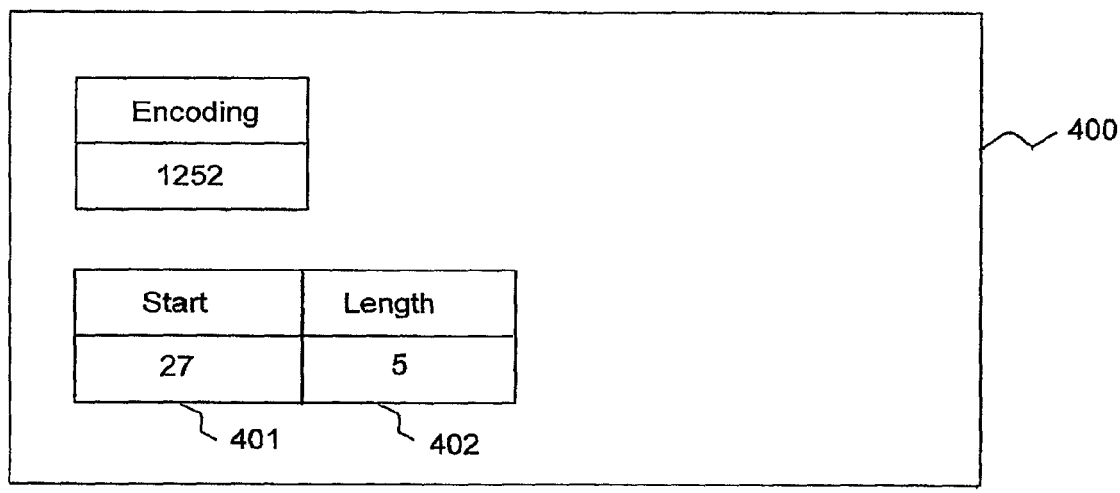
FIG. 4 is a second schematic diagram of an unstructured data store.

The parsing rules 302 may comprise the XML International Tag Set (ITS) rules as described at www.w3.org/TR/its. In this example, the unstructured resource may be unchanged by the parsing (i.e. the unstructured resource without commenting 304 is not output) and the unstructured data store 400 may be as shown in FIG. 4, with the string position information comprising a start position 401 of 27 characters from the start of the file and a string length 402 of 5 characters. In a second example, the unstructured resource 301 may be an HTML file:

<P><!-ID=ID_Hello-->Hello<!-end--></P>

The parsing rules may define that the comments within the HTML should be parsed to determine which pieces to extract and the output unstructured resource without comments 304 may comprise:

<P>Hello</P>

This output resource is smaller than the original resource, thus reducing the amount of memory used, and producing a resource which may be loaded more efficiently. In this example, the resultant unstructured data store 303 may be as shown in FIG. 2.

The parser 300 shown in FIG. 3 may be one of a large number of known parsers, each parser being specific to one or more schemas (e.g. an XML parser for the first example in the preceding paragraph and an HTML parser in the second example). The parsing rules may include external information in addition to or instead of information regarding the schema to enable the creation of the data store (e.g. external information specifying that all text between <b> and </b> markers or all text in headers are strings which should be identified). The combination of rules and external information enable a developer to indicate exactly which strings in a resource should be identified in the data store. In another example, external configuration data may be used instead of, or in addition to, the parsing rules.

Figure 5:
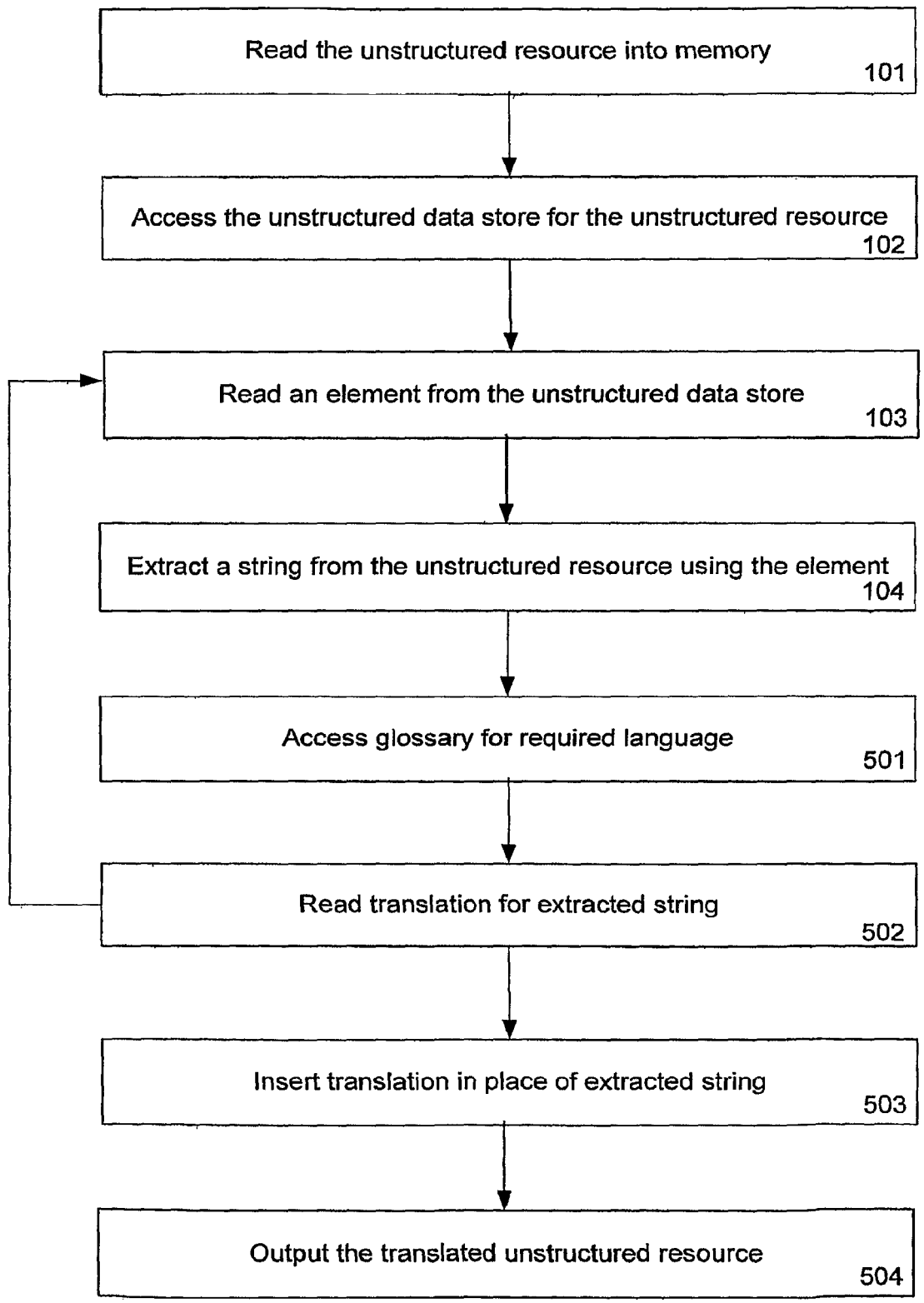
FIG. 5 is an example flow diagram of a method of translating an unstructured resource.

FIG. 5 is an example flow diagram of a method of translating an unstructured resource, for example from English (the base language) to French (the required language). This flow diagram is a modified version of that shown in FIG. 1 and can be described with reference to the same simple example of an unstructured resource comprising an XML file:

<P>Hello</P>

The unstructured resource is read into memory (step 101) and an unstructured data store (e.g. as shown in FIG. 2) associated with the unstructured resource is accessed (step 102). An element is read from the unstructured data store into memory (step 103) and then the position information from this element is used to locate and extract a string from the unstructured resource (step 104 e.g. "Hello"). A glossary is accessed for the required language (French in this example, step 501) and the translation for the string is read from the glossary into memory (step 502). The string identifier (e.g. ID_Hello) may be used to identify which translation in the glossary relates to the extracted string in question, for example as shown in the table below:

| ID | Translation |
|---|---|
| ID_Hello | Bonjour |

In another example, the string itself (e.g. Hello) may instead be used to identify the translation from the glossary that should be used. The glossary may comprise a MUI DLL (multiple language user interface dynamic link library) file, a database, a web service, etc. The translation of the string ('Bonjour' in this example) is then inserted into the resource in place of the extracted string (step 503) and the resultant translated resource is then output (step 504):

<P>Bonjour</P>

Where the resource contains more than one string for translation, the data store comprises more than one element and the method steps (e.g. steps 103, 104, 501-503) may be repeated for each element. As shown in FIG. 5, the translations of each string may be loaded prior to insertion of the translated strings (loop back from step 502 to step 103), however in other examples the steps may be repeated in other orders for example the translated strings may be inserted one at a time (e.g. loop back from step 503 to step 103) or all the strings may be extracted prior to translation (loop back step 104 to step 103 and loop back step 503 to step 502).

In some examples, it may be beneficial to check the identified translation for an extracted string prior to inserting it (i.e. prior to step 503 against one or more rules or criteria). This may be particularly beneficial where the glossary is created by a third party and where there are limits on the string length that can be accommodated within the UI of the application being localised. In such an example, a check may be performed on the identified translation of the extracted string (as loaded in step 502) against a set of translation rules which may be stored as part of the data store, as part of the unstructured resource or elsewhere. For example, the rule may state that the new string has a maximum string length of 25 characters. A minimum string length rule may also be applied (e.g. a minimum of two characters). This checking stage may also check other aspects of the translated string (e.g. correct language, no invalid characters, no html tagging, etc).

Figure 6:
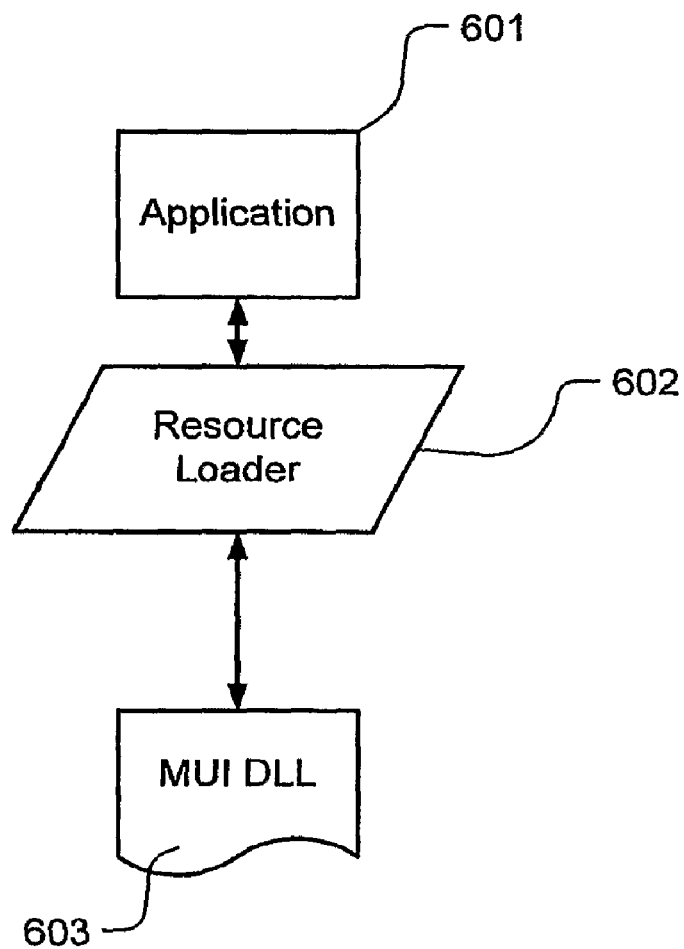
FIG. 6 is a schematic diagram of a localisation system.

The translation method described above may be performed at run-time (e.g. when the application is launched by the user) or may be performed prior to this, for example, as part of creating a localised product which may then be shipped to customers. Where the method is performed at run-time, the method may be performed by a Resource Loader 602 as shown in FIG. 6. When the application 601 is loaded into the computer operating system, a call is made to the resource loader module 602. The resource loader module 602 checks to see what language is called for by the application 601 and then the appropriate MUI DLL 603 can be accessed (in step 501) and from this the appropriate translation can be identified and loaded (in step 502). The translation is then inserted (in step 503) to enable a translated resource to be output (in step 504) to the application 601.

Figure 7:
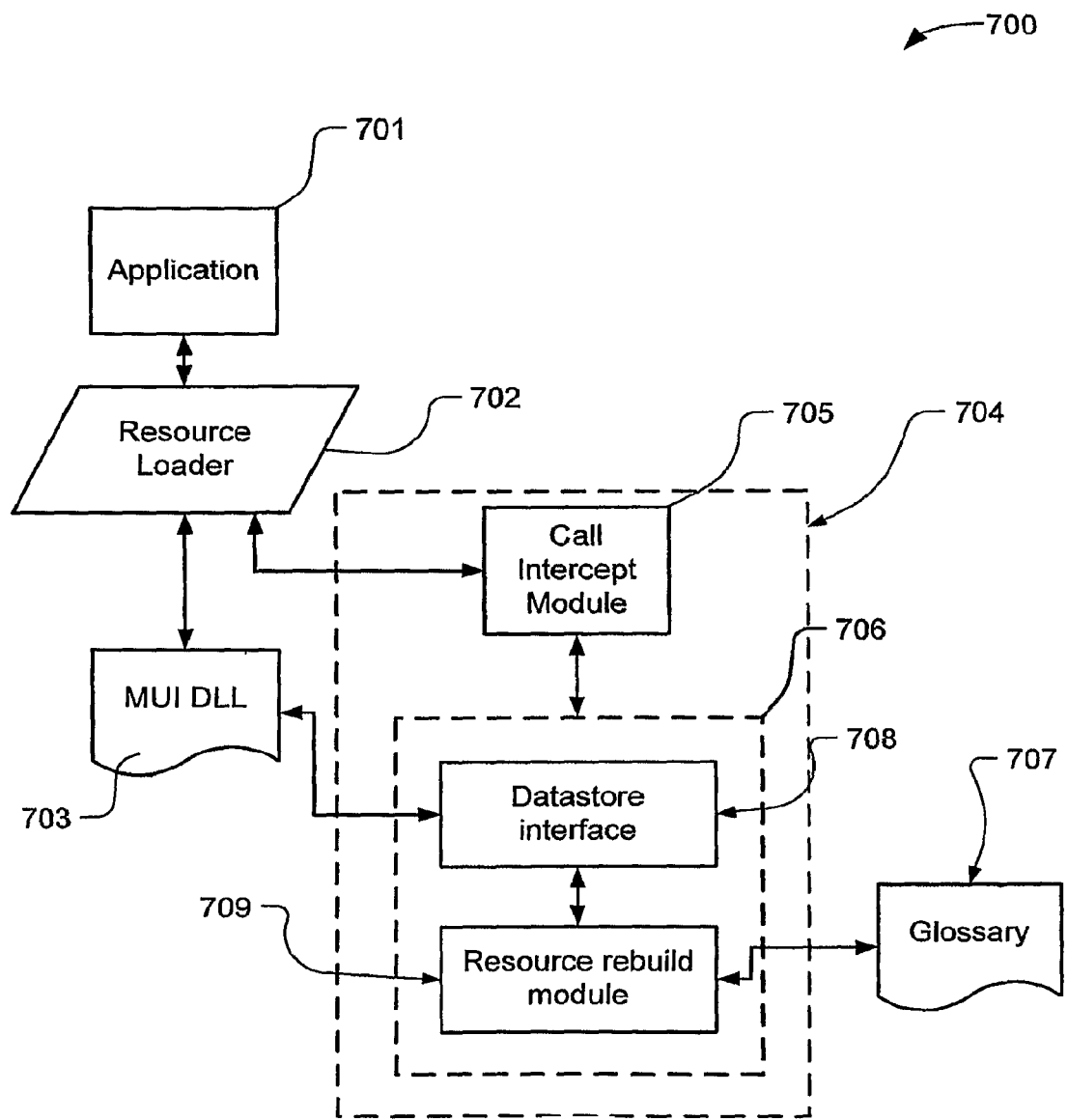
FIG. 7 shows a schematic diagram of an unstructured resource localisation system.
Figure 8:
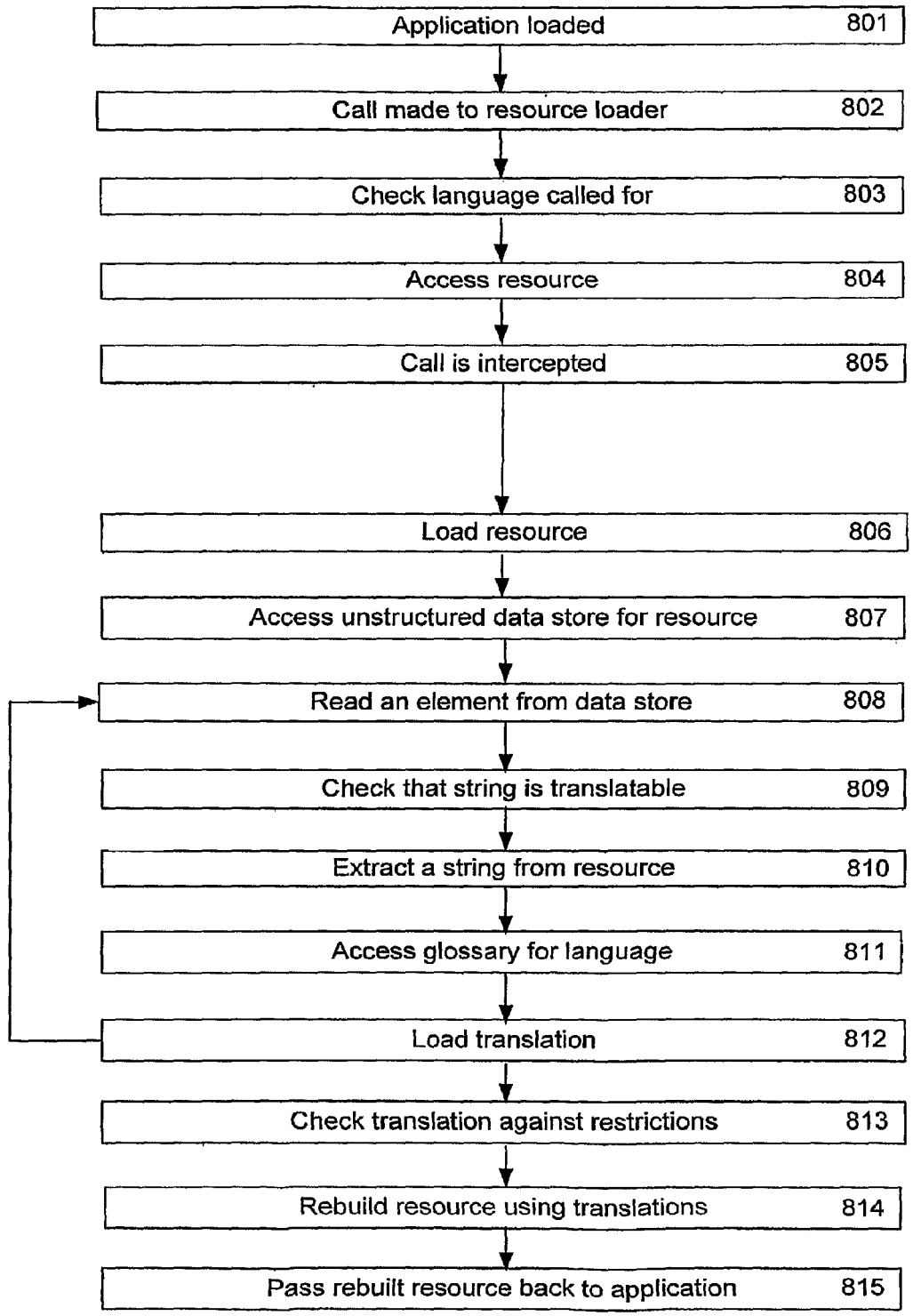
FIG. 8 shows an example flow diagram of a second method of translating an unstructured resource.

A second method of translating an unstructured resource can be described with reference to FIG. 7 which shows a schematic diagram of an unstructured resource localisation system 700 and FIG. 8 which shows an example flow diagram of the translation method. This method uses techniques to ensure safe and secure resource editing, as described in two pending US patent applications "Safe, Secure Resource Editing for Application Localisation", filed Dec. 1, 2004, application Ser. No. 11/002,773 and 'Safe, Secure Resource Editing for Application Localisation with Automatic Adjustment of Application User Interface for Translated Resources' filed Jan. 24, 2005, application Ser. No. 11/042,470.

When an application 701, such as a Microsoft (trade mark) Windows operating system or Microsoft Office (trade mark) application, is loaded (step 801), a call is made to a resource loader module 702 (step 802). The resource loader module 702 checks which language is called for by the application 701 (step 803) and goes to the appropriate language folder. From this folder, the loader 702 retrieves the called resource, for example from a MUI DLL 703 (step 804). At this stage the call is intercepted by a call intercept module 705 (step 805) which forms part of a localisation module 704. There are many known methods that can be used to intercept the resource loading function, for example overwriting the start of the function itself in memory, e.g. with a jump to another function (a technique known as detouring).

Having intercepted the call, the localisation module 704 loads the resource (step 806). In order to locate the strings and other localization data along with resource identifiers for them, the unstructured data store is accessed (step 807) by a datastore interface 708. The datastore interface 708 along with a resource rebuild module 709 form part of the language pack load module 706. This unstructured data store tells the localisation module which strings are available to translate, however it may not be permitted to translate all of the strings. The language pack load module reads any element from the data store (step 808) and checks that a string is translatable (step 809) by checking against the resource list which identifies which ones can actually be changed. This resource list is stored in a way that cannot be altered or interfered with, e.g., in a code signed DLL (although it could also be provided through a secure web service or database). The resource list identifies those strings which are permitted to be translated at run-time by means of the string identifier (or other means). The list may also provide information on where the translations of the strings are stored. If the string is confirmed as being allowed to be translated, the element is used to extract the string from the resource (step 810). A glossary 707 including translations for the required language is accessed (step 811) and the translation for the string is loaded by the resource rebuild module 709 (step 812). The translated string is checked against restrictions and/or rules (step 813). These restrictions/rules may be stored in the code signed DLL for each resource and may be stored in a format which is very quick to parse and validate (they can be part of the resource list or elsewhere). If the translated string fails the restrictions/rules, then it is not used and instead the string is returned in the original language. Having translated all the strings in the resource (by repeating steps 808-813), the resource rebuild module 709 rebuilds the resource using the translations that passed the restrictions and the original strings where the translations failed the restrictions (step 814) and this rebuilt resource is then passed back to the application 701 via the resource loader 702 (step 815). As explained earlier, the loop back shown in the flow diagram (from step 813 to step 809) is shown by way of example and the repetition of the process may be performed in alternative ways.

In the example described above and shown in FIG. 8, a resource list is used to define which strings are translatable (e.g. at run-time) and which strings are not. This may instead be implemented by only identifying those strings which can be translated in the data structure. In another example, a list may be accessed which identifies translatable strings on a resource-by-resource basis rather than a string-by-string basis. Such a list may identify those resources which contain strings that are translatable or alternatively those resources which do not contain any strings that can be translated.

In the examples described above, the method of parsing unstructured resources is used to enable translation of the resource. However, this is not the only application of the method and the extracted strings may be used in any way, including but not limited to creating a list of strings, creating a glossary and editing or checking the strings as is described below with reference to FIGS. 9-11. Furthermore the strings need not be extracted but instead may be located using the data structure and then the strings may be processed in any way. Examples of processing include, but are not limited to, reading, copying (e.g. into memory), amending, replacing, inserting and extracting. The processing may involve more than one step e.g. reading and amending or reading and replacing.

Figure 9:
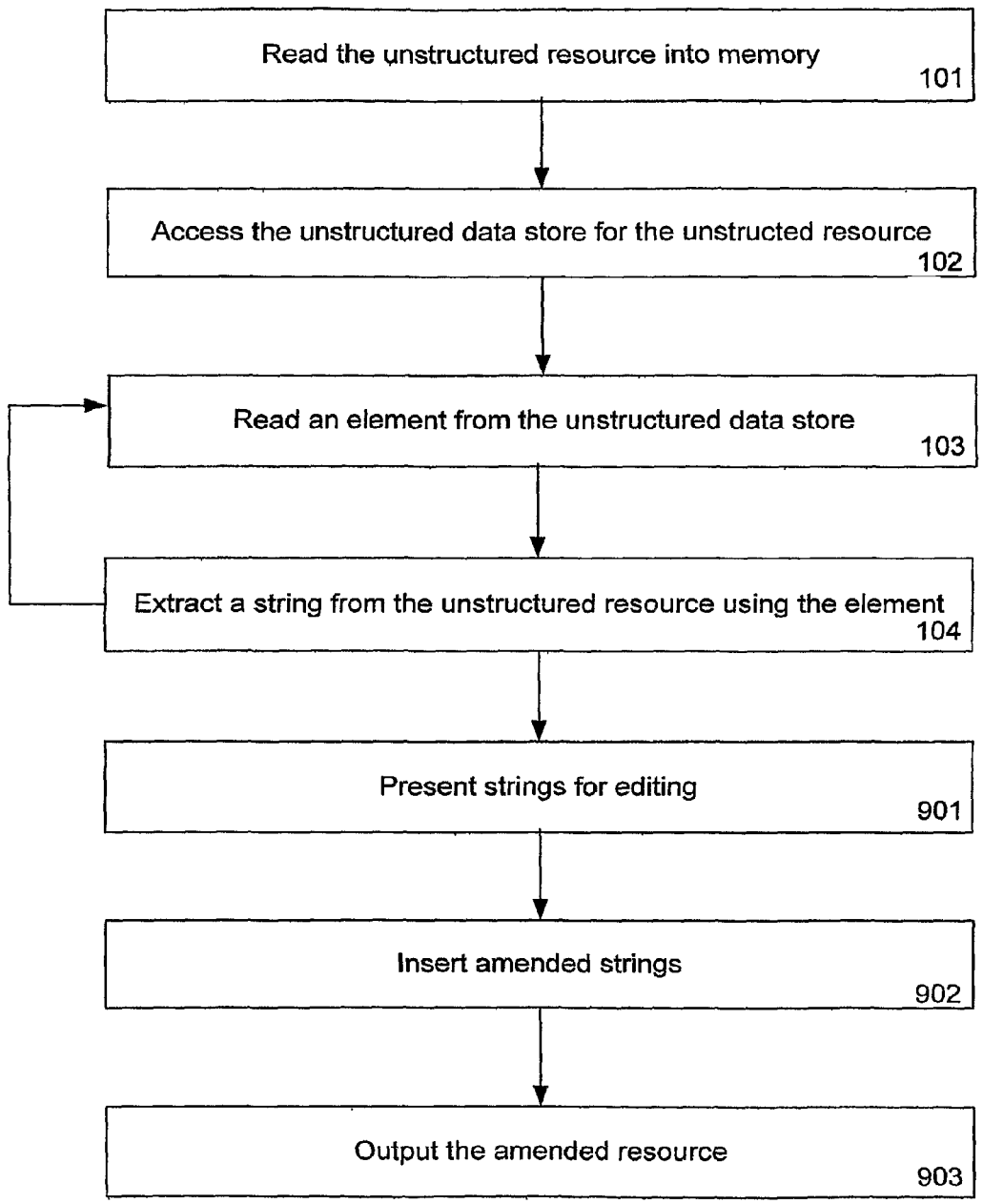
FIG. 9 shows an example flow diagram of a method of editing strings within an unstructured resource.

FIG. 9 shows an example flow diagram of a method of editing strings within an unstructured resource. The strings are extracted as described above with reference to FIG. 1 and then the extracted strings are presented to the user for editing (step 901). Once amended strings have been input, the amended strings are inserted into the resource (step 902) and the amended resource is output (step 903), e.g. by saving it to memory and/or displaying it to the user.

Figure 10:
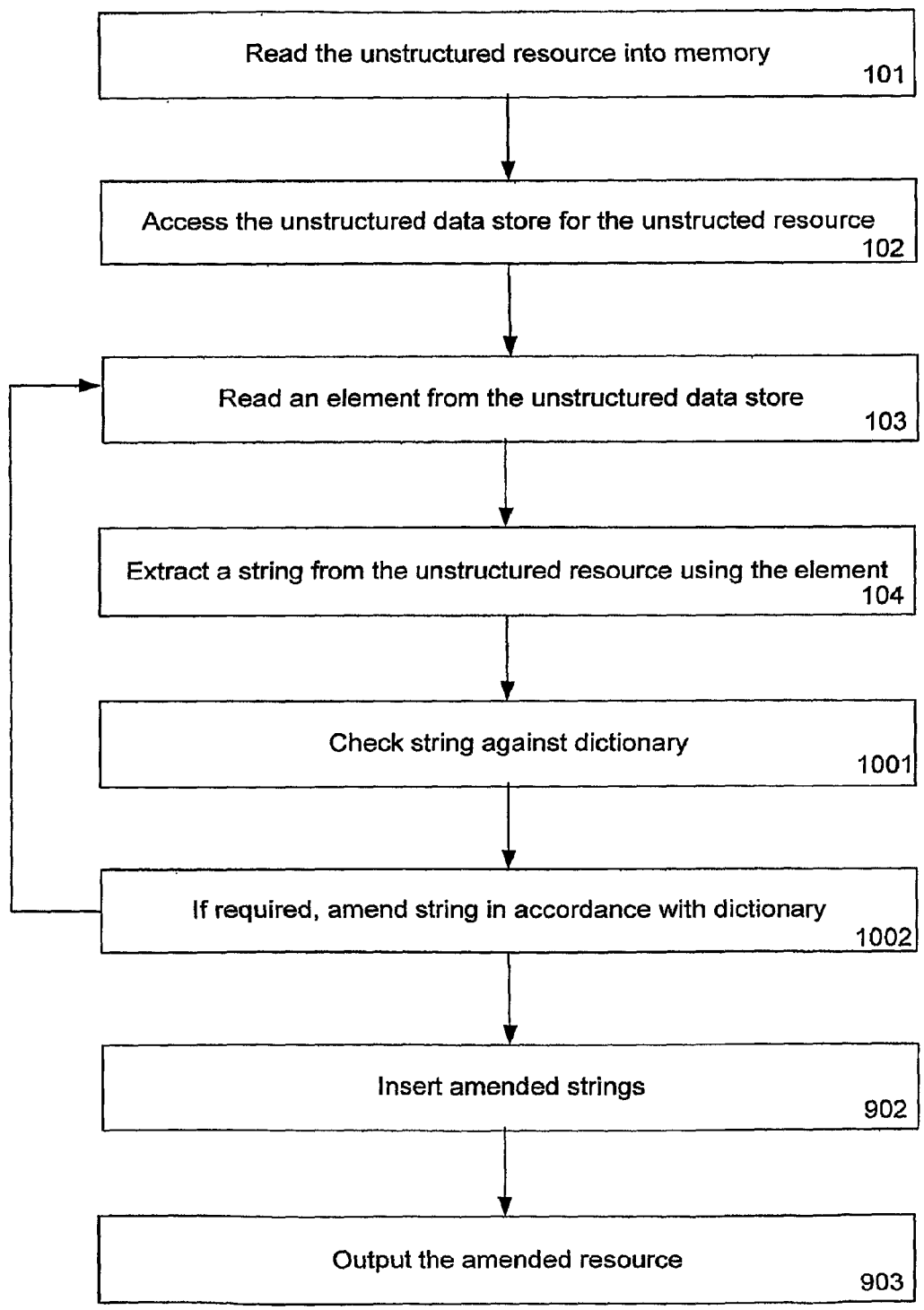
FIG. 10 shows an example flow diagram of a method of checking a resource.

FIG. 10 shows an example flow diagram of a method of checking a resource, for example for checking the spelling or grammar of strings within an unstructured resource. The strings are extracted as described above with reference to FIG. 1 and then each extracted string is checked against rules (step 1001). These rules may comprise a dictionary and/or grammar rules. In other examples, these rules may comprise functional rules, such as maximum or minimum lengths (e.g. as described earlier). If required, the strings may be automatically amended as a result of these rules (step 1002) or the strings, plus suggested alternatives may be presented to a user for selection of one alternative. The amended strings are then inserted into the resource (step 902) and the amended resource can then be output (step 903). This method may be used for checking any aspect of the strings and is not limited to spelling and grammar. For example, the strings may be checked for inappropriate words or phrases, for particular keywords, characters etc. In another example, no amendments may be made but a report may be generated.

Figure 11:
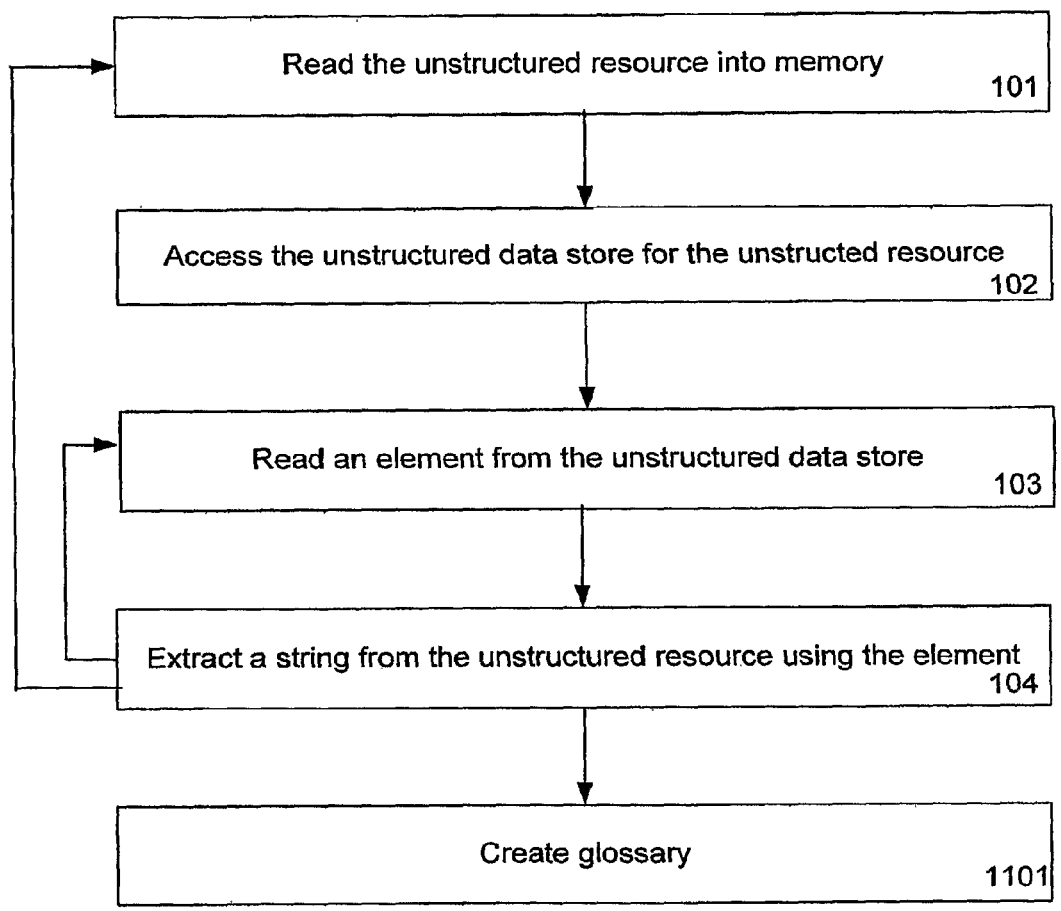
FIG. 11 shows an example flow diagram for creating a glossary containing terms in more than one language.

FIG. 11 shows an example flow diagram for creating a glossary containing terms in more than one language. Strings are first extracted from a first unstructured resource in a first language as described above with reference to FIG. 1. This process is also carried out for one or more additional languages in a similar manner (steps 101-104). All the sets of extracted strings are then combined to form a glossary (step 1101).

In the above examples, the unstructured data store is used to locate and extract strings from an unstructured resource. However, in another example the unstructured data store could be used for insertion of strings, for example, in Microsoft (trade mark) Windows resource loader. For example, an application (e.g. Microsoft (trade mark) Word) may be written so it is language independent (rather than having a base language which is then translated) and then a resource loader may use the data store to enable it to insert strings of the required language into a resource in the correct positions. An example of an unstructured resource without any language data including English is:

<p></p><br><p></p>

Such a resource may have an unstructured data store containing two elements as shown in the table below:

| ID | Start |
|---|---|
| ID_1 | 3 |
| ID_2 | 14 |

This data store is a language independent because the unstructured resource does not contain any language specific elements.

In this example, the string position information comprises a single piece of information, the start position of the string relative to the start of the resource.

Note that as each string is inserted the start offsets of the remaining strings need to be adjusted accordingly. The strings to be inserted may be held in a database which contains the strings in several different languages, for example:

| ID | Language = English | Language = French |
|---|---|---|
| ID_1 | Hello | Bonjour |
| ID_2 | Monday 13$^{th}$ March | Lundi, le 13 Mars |

Figure 12:
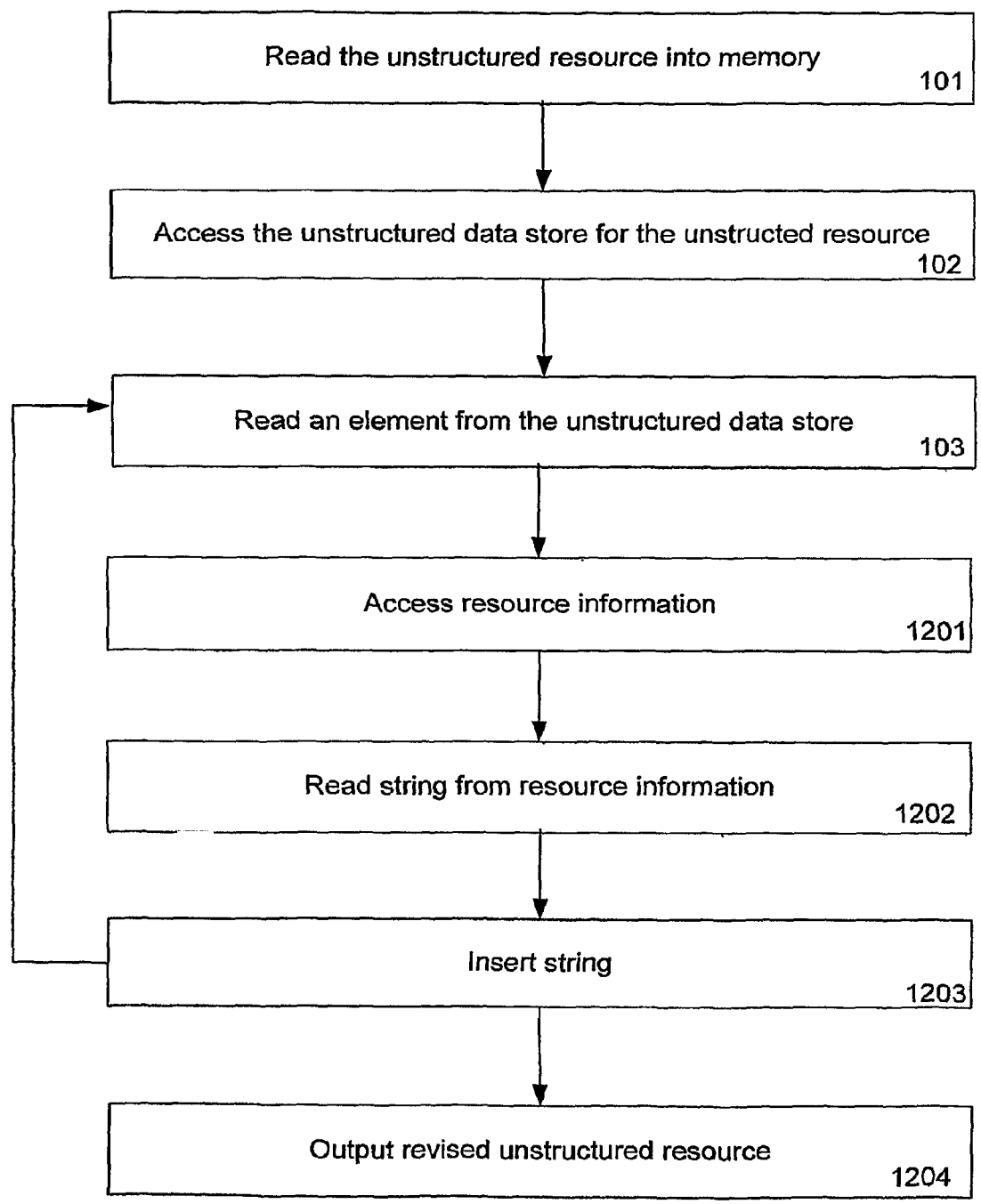
FIG. 12 shows an example flow diagram for loading a resource.

The method of loading this resource can be described with reference to the flow diagram shown in FIG. 12. The unstructured resource (e.g. the example shown above) is read into memory (step 101) and the unstructured data store for the resource is accessed (step 102). An element (e.g. [ID_1, 3]) is read from the data store (step 103). Resource information is accessed (step 1201), for example, this may be a database of strings for a particular application, and using the information read from the data store (in step 103), a string is read from the resource information (step 1202) for the particular language which is required (e.g. Hello). This string is then inserted into the resource (step 1203) and the method may then be repeated to insert further strings into the resource (steps 103, 1201-1203). Having inserted all the required strings, the revised unstructured resource can then be output (step 1204):

<p>Hello</p><br><p>Monday 13$^{th}$ March</p>

In this example, the unstructured resource may initially have been written with strings included, however, these strings may have been removed when the application was built, (e.g. as shown in FIG. 3) to create a smaller resource which is language independent, requires less storage space, can be loaded more efficiently and which is simpler to localise.

By writing the resource in a non-language specific manner and storing the strings in a separate database (or multiple databases), a third party may be able to create additional resources for localisation, without requiring access to any code which may be confidential. In such cases it may be beneficial to compare the identified string for insertion against one or more rules prior to insertion (as described above with reference to methods of translation). These rules may be contained within the database or within the unstructured data store as shown below:

| ID | Start | Maximum length |
|---|---|---|
| ID_1 | 3 | 50 |
| ID_2 | 14 | 50 |

The rules may alternatively be stored separately.

Figure 13:
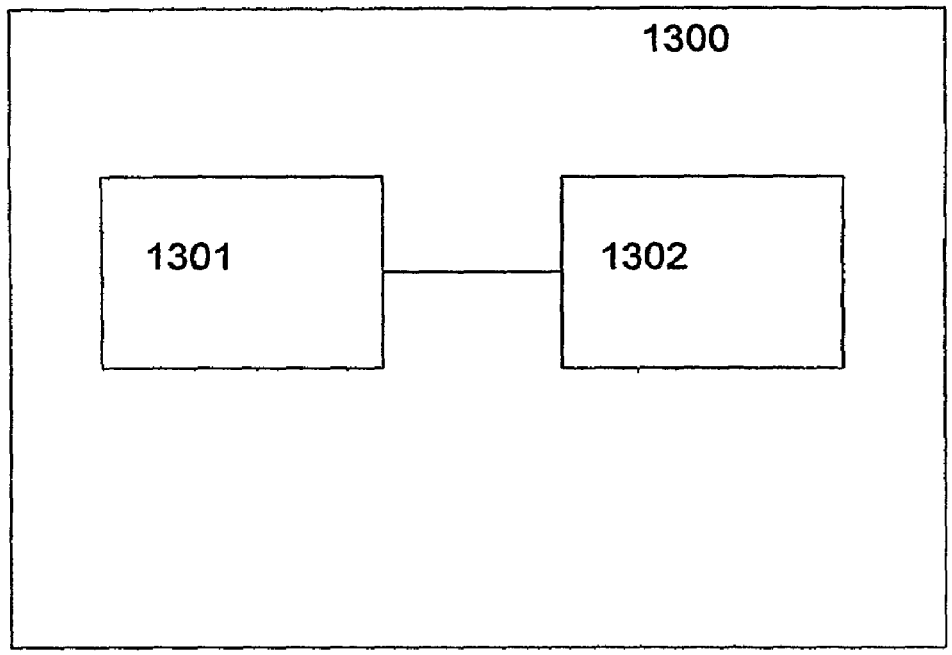
FIG. 13 shows a schematic diagram of a system for performing any of the methods described.

FIG. 13 shows a schematic diagram of a system 1300 for performing any of the methods described. The system comprises a processor 1301 and a memory 1302. The memory 1302 is used to store the series of instructions which are required to cause the processor to perform the methods, when those instructions are executed by the processor. In addition, the memory 1302 is used to store data which has been read, such as strings.

All the examples provided above use very simple examples of unstructured resources (e.g. single lines of XML or HTML) by way of example only. The methods described could be used for very large unstructured resources containing very many strings resulting in data stores comprising very many elements. For example, the unstructured resource may be a large document in XML, a web page etc.

In the examples given above, strings within an unstructured resource are processed. However, the use of strings is by way of example only and the methods and systems described may be used with any type of data portion, including strings, coordinate sets, sizes, hotkeys etc.

Although the methods are primarily directed to unstructured resources, they could also be used for parsing those structured resources in which it is possible to edit a string without adversely impacting the overall resource (e.g. structured resources without length limitations). The methods may be used for textual or non-textual formats.

In the above examples, the methods are described as being carried out at run-time, build-time, pre-run-time etc. These terms are used by way of example only and the methods are suitable for use at any time.

Although the data store is described above as identifying identifiers and positions for strings, the data store could, alternatively, be used to identify the positions of other aspects of an unstructured resource such as coordinates, hotkeys, comments, etc.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Any range or device value given herein may be extended or altered without losing the effect sought, as will be apparent to the skilled person.

The steps of the methods described herein may be carried out in any suitable order, or simultaneously where appropriate. The loop backs shown in the flow diagrams are by way of example only and loops may start and/or end at different steps.

It will be understood that the above description of a preferred embodiment is given by way of example only and that various modifications may be made by those skilled in the art.

The invention claimed is:

1. A method of processing an unstructured resource comprising:
   reading the unstructured resource into memory, the unstructured resource comprising one or more data portions;
   accessing a data structure associated with the unstructured resource, the data structure comprising one or more elements, each element being associated with a data portion and comprising position information for the associated data portion;
   reading a first element from the data structure into memory, the first element comprising position information for a first data portion;
   locating the first data portion within the unstructured resource using the position information for the first data portion;
   accessing a rules database;
   processing the first data portion, including:
      amending the first data portion in accordance with the rules database to create a first amended data portion; and
      inserting the first amended data portion into the unstructured resource in place of the first data portion; and
   repeating the reading, locating and processing steps for each of the one or more elements in the data structure.

2. A method according to claim 1, further comprising:
   accessing a store of replacement data portions,
   and wherein processing the first data portion comprises:
      selecting a first replacement data portion from the store of replacement data portions based on the first element; and
      inserting the first replacement data portion into the unstructured resource in place of the first data portion.

3. A method according to claim 2, further comprising, following the selecting, checking if the first replacement data portion satisfies predefined criteria and if not, omitting the inserting.

4. A method according to claim 3, wherein the predefined criteria comprise data portion length criteria, valid character criteria or a predefined resource list.

5. A method according to claim 3, further comprising:
   reading the predefined criteria into memory from the unstructured resource, the data structure or the store of replacement data portions.

6. A method according to claim 2, wherein the store of replacement data portions comprises one of: a database of data portions translated for one or more languages and a dictionary database.

7. A method according to claim 2, wherein a data portion comprises a string, a hotkey, a coordinate set, a size, modifiable data or localisable data.

8. A method according to claim 1, wherein:
   reading the unstructured resource into memory comprises reading the unstructured resource into memory from a location; and
   the method further comprises outputting an amended unstructured resource including the first amended data portion to the location.

9. A method according to claim 1, wherein the first data portion comprises a string and wherein the rules database comprises one or more of: length rules, allowed character rules, allowed word rules, prohibited word rules, grammar rules and spelling rules.

10. A method according to claim 1, wherein each data portion in the unstructured resource comprises a string in a first language, and processing the first data portion comprises extracting a first data portion, and wherein the method further comprises:
   reading a second unstructured resource into memory, the second unstructured resource comprising one or more data portions, each data portion in the second unstructured resource comprising strings in a second language;
   accessing a second data structure associated with the second unstructured resource, the second data structure comprising one or more elements, each element being associated with a data portion in the second unstructured resource and comprising position information for the associated data portion;
   reading a first element from the second data structure into memory, the first element comprising position information for a first data portion in the second unstructured resource;
   extracting the first data portion from the second unstructured resource using the position information for the first data portion in the second unstructured resource;

repeating the reading and extracting steps for each of the one or more elements in the second data structure; and outputting all the extracted data portions from both unstructured resources.

11. A method according to claim 1, wherein the unstructured resource comprises one of: Java Script, Cascading Style Sheets, an INI file, a Registry file, an HTML file and an XML file.

12. A method according to claim 1, wherein each element further comprises a data portion identifier.

13. A method according to claim 1, wherein the position information comprises at least one of: a data portion length indicator and a data portion end position.

14. A method according to claim 1, wherein the data structure further comprises encoding information.

15. A computer readable medium storing computer-executable instructions that, when executed, cause one or more processors to perform acts comprising:

reading an unstructured resource into memory, the unstructured resource comprising one or more data portions;

accessing a data structure associated with the unstructured resource, the data structure comprising one or more elements, each element being associated with a data portion and comprising position information for the associated data portion;

reading a first element from the data structure into memory, the first element comprising position information for a first data portion;

locating the first data portion within the unstructured resource using the position information for the first data portion;

accessing a store of replacement data portions;

processing the first data portion, wherein processing the first data portion comprises:

selecting a first replacement data portion from the store of replacement data portions based on the first element; and inserting the first replacement data portion into the unstructured resource in place of the first data portion; and repeating the reading, locating and processing steps for each of the one or more elements in the data structure.

16. A computer readable medium according to claim 15, the acts further comprising following the selecting, checking if the first replacement data portion satisfies predefined criteria and if not, refraining from the inserting.

17. A computer readable medium according to claim 16, wherein the predefined criteria comprise one or more of: data portion length criteria, valid character criteria, or a predefined resource list.

18. A computer readable medium according to claim 15, the acts further comprising:

loading an application prior to reading the unstructured resource into memory, wherein the application is associated with the unstructured resource checking a required language for the application; and passing an amended unstructured resource to the application.

19. A computer readable medium according to claim 15, the acts further comprising, prior to accessing a store of replacement data portions, identifying the store of replacement data portions based on the required language for the application.

20. A system comprising:

a processor; and a memory, coupled with and readable by the processor and containing a series of instructions that, when executed by the processor, cause the processor to perform operations comprising:

reading an unstructured resource into the memory from a particular location, the unstructured resource comprising one or more data portions;

accessing a data structure associated with the unstructured resource, the data structure comprising one or more elements, each element being associated with a data portion and comprising position information for the associated data portion;

reading a first element from the data structure into the memory, the first element comprising position information for a first data portion;

locating the first data portion within the unstructured resource using the position information for the first data portion;

accessing a store of replacement data portions;

processing the first data portion, including:

selecting a first replacement data portion from the store of replacement data portions based on the first element; and inserting the first replacement data portion into the unstructured resource in place of the first data portion;

repeating the reading, locating and processing steps for each of the one or more elements in the data structure to obtain an amended unstructured resource; and outputting the amended unstructured resource to the particular location.

* * * * *